US012649535B2

(12) United States Patent
Cotton et al.

(10) Patent No.: US 12,649,535 B2
(45) Date of Patent: Jun. 9, 2026

(54) SAFETY HELMET

(71) Applicant: HEADLOK PTY LTD, Hampton (AU)

(72) Inventors: Lisa Jane Cotton, Hampton (AU);
Mark Matthews-Frederick, Hampton
(AU); Davis Tolley, Hampton (AU);
Mamoru Tanida, Hampton (AU);
Graeme Marshall, Hampton (AU)

(73) Assignee: HEADLOK PTY LTD, Hampton (AU)

( * ) Notice: Subject to any disclaimer, the term of this
patent is extended or adjusted under 35
U.S.C. 154(b) by 45 days.

(21) Appl. No.: 18/573,185

(22) PCT Filed: Jun. 22, 2022

(86) PCT No.: PCT/AU2022/050631
§ 371 (c)(1),
(2) Date: Dec. 21, 2023

(87) PCT Pub. No.: WO2022/266709
PCT Pub. Date: Dec. 29, 2022

(65) Prior Publication Data
US 2024/0286693 A1      Aug. 29, 2024

(30) Foreign Application Priority Data

Jun. 22, 2021    (AU) ................................. 2021901872
Aug. 25, 2021    (AU) ................................. 2021221713

(51) Int. Cl.
*A42B 3/08*              (2006.01)
*B62H 5/00*              (2006.01)
(Continued)

(52) U.S. Cl.
CPC ................. *B62J 11/24* (2020.02); *A42B 3/08*
(2013.01); *B62H 5/001* (2013.01); *B62H*
*5/003* (2013.01); *E05B 37/02* (2013.01)

(58) Field of Classification Search
USPC .......................................... 2/411, 422; 70/58
See application file for complete search history.

(56) References Cited

U.S. PATENT DOCUMENTS 3,436,936  A  *  4/1969  Locker ..................... B62J 11/24
                                                              70/59
4,766,616  A      8/1988  Donahue
(Continued)

FOREIGN PATENT DOCUMENTS

CN              104366864  A      2/2015
CN              212938193  U      4/2021
(Continued)

OTHER PUBLICATIONS

International Search Report and Written Opinion dated Aug. 9,
2022, for corresponding PCT Application No. PCT/AU2022/
050631.

*Primary Examiner* — Matthew R Marchewka
(74) *Attorney, Agent, or Firm* — Kinney & Lange, P.A.

(57)                ABSTRACT

A safety helmet includes a wearable helmet body for pro-
tecting a wearer's head and an adjustable strap for securing
the helmet body to the wearer's head. The helmet further
includes a locking arrangement integrated with the helmet
body and a locking member including a tether which is
extendible and retractable with respect to the locking
arrangement, the locking arrangement configured to selec-
tively lock the tether in a closed configuration allowing
secure tethering of the safety helmet to an external fixture
and the locking arrangement further including a reel around
which the tether is wound and unwound during retraction or
extension of the tether.

20 Claims, 7 Drawing Sheets

(51) Int. Cl.
    *B62J 11/24*       (2020.01)
    *E05B 37/02*      (2006.01)

(56)            References Cited

U.S. PATENT DOCUMENTS

| | | | | | |
|---|---|---|---|---|---|
| 4,833,726 | A | * | 5/1989 | Shinoda | A42B 3/30 |
| | | | | | 455/90.3 |
| 5,117,662 | A | * | 6/1992 | Holmes | A42B 3/0413 |
| | | | | | 70/38 C |
| 5,459,910 | A | * | 10/1995 | Anscher | A44B 11/266 |
| | | | | | 24/615 |
| 5,564,129 | A | * | 10/1996 | Ball | A42B 3/0413 |
| | | | | | 70/59 |
| 9,210,963 | B1 | * | 12/2015 | Ellis | H04R 1/028 |
| 2005/0044903 | A1 | * | 3/2005 | Ling | E05B 67/02 |
| | | | | | 70/30 |
| 2014/0000322 | A1 | * | 1/2014 | Williams | B62H 5/003 |
| | | | | | 70/18 |
| 2021/0352990 | A1 | * | 11/2021 | Sadaoui | A42B 3/0413 |

FOREIGN PATENT DOCUMENTS

| | | | |
|---|---|---|---|
| CN | 213710730 | U | 7/2021 |
| KR | 20120000327 | U | 1/2012 |
| KR | 20140069534 | A | 6/2014 |
| WO | 2020070317 | A1 | 4/2020 |

* cited by examiner

10

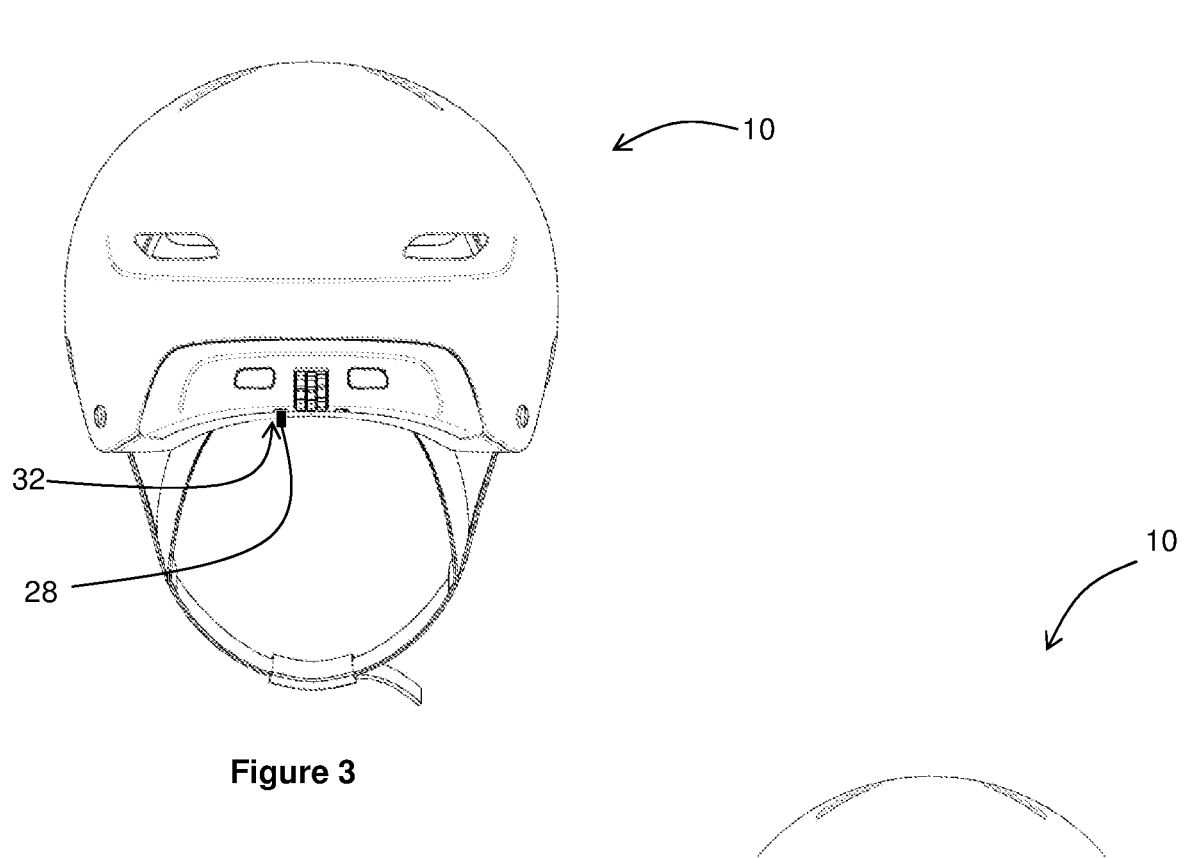
Figure 3
Figure 4
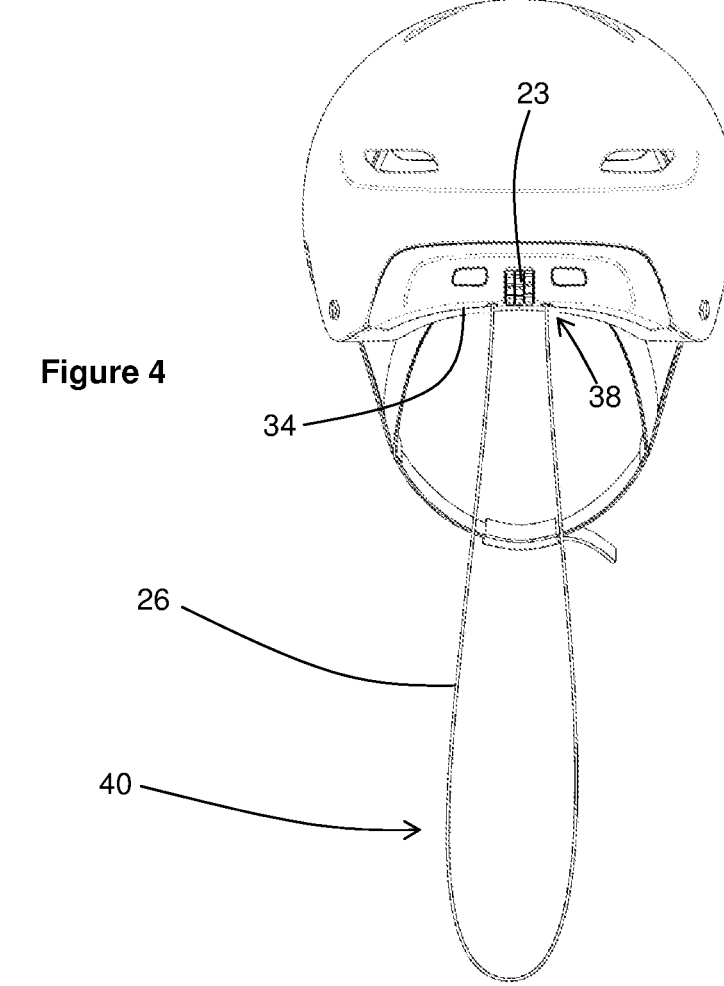

SAFETY HELMET

CROSS-REFERENCE TO RELATED APPLICATIONS

The present application is a Section 371 National Stage Application of International Application No. PCT/AU2022/050631, filed on Jun. 22, 2022, which claims priority to Australian patent application 2021901872, filed Jun. 22, 2021, and to Australian patent application 2021221713, filed Aug. 25, 2021. The entirety of these applications is hereby incorporated by reference.

TECHNICAL FIELD

The present disclosure relates to a safety helmet. This disclosure has particular application as a helmet for riders of bicycles, scooters, skateboards, skis or other transportation or recreation devices. However, it will be appreciated that the disclosed safety helmet may be used in other applications for example, as a hard hat in hazardous workplace environments.

BACKGROUND

The following discussion of the background to the disclosure is intended to facilitate an understanding of the safety helmet described herein. However, it should be appreciated that the discussion is not an acknowledgement or admission that any of the material referred to was published, known or part of the common general knowledge as at the priority date of the application.

Safety helmets such as bicycle helmets are well known for use for protecting a wearer's head in the event of a fall from a bicycle or other transportation device such as a scooter, roller blades, skateboard or the like. During use, helmets are strapped to the owner's head and therefore well secured against theft. However, helmets are vulnerable to theft where the owner has removed the helmet upon arrival at a destination. For example, where a helmet has been stowed unattended in a public area such as when a helmet is strapped to a bicycle that has been locked to a bicycle rack.

To prevent theft of an unattended helmet, it is common for owners to carry their helmet with them while leaving a bicycle locked in a secure position. This practice is inconvenient due to helmets being relative bulky and difficult to fit within a bag. An alternative practice is to lock the helmet together with the bicycle or scooter. However, this typically involves locking the helmet through the flexible helmet strapping which can be cut by a thief with relative ease.

In view of these issues, locking helmets have been developed with incorporated locking mechanism allowing the helmet and/or a bicycle to be locked using the helmet locking mechanism.

One such example is disclosed in Korean Patent Application KR20140069534 which relates to a helmet having a combination lock integrated with a retractable helmet strap. The two portions of the helmet strap are retractable so as to allow the two portions to be extended and lock to one another through a fixture such as a bicycle rack or a bicycle wheel. Other examples are provided by Chinese patent application 212938193, Korean patent application 20120000327 and U.S. Pat. No. 4,766,616 which relate to helmets having locking tethers that are retractable into a conduit or along a track and which may be extended and locked in order to secure the helmet against theft.

Before turning to a summary of the disclosure it is useful to provide an explanation of some of the terms that will be used to define the spatial relationship of various parts thereof. Spatial references herein are to be understood in the context of a helmet worn on a wearer's head. In this context, terms such as 'upper', 'lower' 'upwardly', 'downwardly', 'higher', 'lower' will be understood with reference to a ground surface on which the wearer is standing or sitting. Terms such as downwardly-facing will be understood in the context of a helmet worn on a wearer's head as meaning a surface facing generally downward toward the ground. Furthermore, it will be understood that a helmet has an outside and an inside and thus terms such as 'inner', 'outer', 'inwardly', 'outwardly' will be understood in this context. Moreover, a helmet has a front and a rear which will be understood with reference to a front and rear of a wearer's head. Accordingly, a 'lower-rear' part of the helmet will be understood as meaning a part of the helmet overlying or adjacent to a lower-rear part of the wearer's head.

SUMMARY

It is desirable to provide an alternative locking safety helmet which provides improved security against theft as compared to existing locking helmets and/or which provides an alternative helmet choice for consumers.

According to an aspect of the present disclosure there is provided, a safety helmet including: a wearable helmet body for protecting a wearer's head; an adjustable strap for securing the helmet body to the wearer's head; and a locking arrangement integrated with the helmet body and a locking member comprising a tether which is extendible and retractable with respect to the locking arrangement, the locking arrangement configured to selectively lock the tether in a closed configuration allowing secure tethering of the safety helmet to an external fixture and the locking arrangement further including a reel around which the tether is wound and unwound during retraction or extension of the tether.

The present disclosure advantageously provides a safety helmet having an integrated locking arrangement which allows the helmet to be selectively tethered to an external fixture. The disclosed safety helmet eliminates the need for a helmet wearer to carry a separate lock for use in locking an unattended helmet to a locked bicycle and does not rely on locking the helmet via the helmet straps which are vulnerable to cutting. Moreover, the present disclosure allows the helmet and a bicycle or other equipment to be securely tethered via a locking arrangement that is integrated with the helmet body. The disclosed safety helmet therefore eliminates the need to carry a bicycle lock because the helmet can itself be used to lock the bicycle. The locking helmet of the present disclosure may therefore function as an anti-theft lock itself to protect equipment such as bicycles, skis, scooters and the like.

The present disclosure provides an improvement as compared to numerous previous locking helmets and due at least in part to the present disclosure utilising a reeled tether and a locking arrangement which is integrated within the helmet body. This provides several advantages including anti-tampering protection for the lock arrangement insofar as the lock arrangement is provided with the helmet body and may therefore be concealed or secured within a portion of the helmet body. The locking arrangement may also be protected from impact damage by virtue of being integrated with the helmet body. This represents an improvement as compared to Korean Patent Application KR20140069534 which locates the locking arrangement in a strap which not integrated with the helmet body and is therefore more vulnerable to tampering and/or impact damage.

Furthermore, Korean Patent Application KR20140069534 provides a two-part lock strap configuration wherein each half of the lock strap must be combined together distant from the helmet body. This required two (or more) handed operation in that one hand is required to hold each half of the locking strap whilst the user must also hold the helmet and potentially also hold a bicycle. The helmet body integration of the locking arrangement that is provided by the present disclosure advantageously facilitates more convenient operation in that a free end of the tether can be passed through a fixture or bicycle frame and then returned to the helmet body which includes the locking arrangement.

The present disclosure also provides an advantage as compared to the previous locking helmets disclosed in Chinese patent application 212938193, Korean patent application 20120000327 and U.S. Pat. No. 4,766,616. Each of these devices are restricted in their tether length due to the use of a tether track or conduit and whereby the tether can only be extended as long as the length of the tether conduit. The maximum extension of the tether in these devices is therefore limited to the size of conduit which can be located on the helmet and the maximum extension may typically not be sufficient (or is at least inconvenient) for passing the tether through a bicycle or multiple bicycles and then returning the tether to the helmet body for locking.

The closed configuration of the locking arrangement may comprise a closed loop configuration. In an alternative embodiment, the locking member may form an enclosed loop to which a tether may be connected. For example, the locking member could comprise a steel locking pin or locking hook which is movable between an open (unlocked) position in which a tether can be connected and a locked (closed) position in which the locking member provides a closed loop to or through which a tether is can be secured to the locking arrangement. According to this embodiment, a user might tether the helmet via the cable of another bike lock or via a separate cable or chain. The locking member may therefore be configured for use with an external tether that is not part of the safety helmet.

According to an alternative embodiment of the disclosure, the safety helmet includes a self-contained tether. In this form, there is advantageously no requirement for a user to supply or carry an external tether. In an embodiment of the disclosure, the locking member comprises a tether. For example, the locking member may comprise a flexible tether configured to be connected to an external fixture such as a bike rack or another object such as a bike. The flexible tether may comprise a steel wire, steel cable, cut-resistant cord or strap or any other suitable tether. The flexible tether could comprise non-metal materials such as polymers and could comprise a polymer wire or polymer tether. According to this embodiment, the locking member may itself be looped around the external fixture and locked a closed loop configuration to secure the helmet to the external fixture.

According to an embodiment of the disclosure, the flexible tether is sufficiently long so as to allow both the helmet and a transportation device to be locked to an external fixture. For example, the tether may be sufficiently long to allow a bicycle and the helmet to be simultaneously locked to a bike rack using only the flexible tether of the locking arrangement. In applications where the safety helmet comprises a hard hat for use on a work site, the tether may be sufficiently long to allow securing of equipment such as a tradesperson's tools.

The closed loop configuration of the locking member could be any configuration allowing an object to be secured within the loop of the locking member. In the case that the locking member is not a tether itself and, for example, is a locking hook then the closed loop configuration could comprise the hook being moved (for example pivoted) to a closed position where a tether may be secured within the hook and is unable to be removed without returning the hook to its open (i.e. unlocked) configuration. In the alternative case where the locking member is, itself, a tether then the closed loop configuration may involve part of the tether (such as a free end of the tether) being engaged with the locking arrangement such that an external fixture such as a bike rack is secured within the closed loop of the tether.

The locking arrangement of the disclosed safety helmet is configured to allow tethering of the safety helmet to an external fixture such as a bike, a bike rack, fence, gate, pole, street sign post, storage cage, automobile or any other object that is sufficiently large or immovable such that a thief would be prevented or dissuaded from stealing both the helmet and the external fixture. However, the locking arrangement does not necessarily need to be tethered to an external fixture and may for example be tethered through a bicycle wheel such that the wheel is prevented from rotating and thus preventing a thief from riding away with the bicycle with the tether in place.

A safety helmet according to the present disclosure may comprise a bicycle helmet, skier or snowboard helmet, horse riding helmet, motorsports helmet, scooter or skateboard helmet, hard-hat, kayaker or white-water rafting windsurfing or other water-sports helmet, motorcycle helmet or any other type of helmet application in which it is occasionally desirable to leave the helmet unattended and therefore potentially vulnerable to theft.

It will therefore be appreciated that the tether of the locking arrangement could be fed through a variety of different fixtures or objects, depending on the type of safety helmet. In the example of a ski helmet, the tether of the locking arrangement may be fed through a ski rack and/or may engage with the skis themselves so as to simultaneously lock the helmet and the skis to the ski rack.

In embodiments of the disclosed safety helmet where the locking member comprises a tether, the locking arrangement may lock the tether in a closed loop configuration by engaging with any tether section, along the length of the tether. For example, a loop could be formed by the locking arrangement gripping, enclosing or otherwise engaging with a section of the tether that is spaced apart from a distal end of the tether.

However, according to a particular embodiment of the disclosure, the locking arrangement is configured to lock a free end of the tether to the locking arrangement. The free end of the tether may be engaged by the locking arrangement in a variety of ways. According to one embodiment, the free end of the tether includes a locking element and the locking arrangement is configured to engage with the locking element in order to lock the free end of the tether to the locking arrangement.

The locking element may be formed of a rigid material such as steel. The locking element may comprise a block, pin, loop or any configuration suitable to be engaged by the locking arrangement. Locking of the locking element by the locking arrangement may involve gripping of the locking element by a component of the locking arrangement. For example, the locking element may include a groove or an opening which is engaged by one or more movable locking pins or movable locking clamps within the locking arrangement.

The locking element may have a larger diameter or width as compared to the flexible tether. In this embodiment, locking of the locking element may involve the locking arrangement gripping or enclosing a portion of the tether adjacent to the locking element such that the larger size of the locking element is prevented from being withdrawn from the locking arrangement.

The locking element may be ergonomically configured to facilitate use. For example, the locking element may be configured to facilitate manual insertion of the locking element into the locking arrangement. The locking element may be provided with a soft or resilient coating such as a rubber or polymer coating for improved comfort when pressing, pushing or otherwise inserting the locking element into the locking arrangement. The locking element may be configured in its shape for improved comfort and, for example, may have a gripping or pressing portion shaped for conformity with a thumb or finger to facilitate ergonomic and comfortable insertion of the locking element into the locking arrangement. Portions of the locking element intended to contact a user's hand may be configured for improved comfort. For example, the locking element may include a bevelled or rounded or softened edge to provide improved comfort when pressing the locking element into the locking arrangement.

In another alternative embodiment, the locking element is of larger width or diameter than the tether and the locking arrangement includes an adjustable aperture and through which the locking element is inserted whilst the aperture is in an enlarged mode. The aperture may then be reduced to a size in between the diameter of the tether and the diameter the locking element so as to prevent the locking element being removed from the aperture.

According to a particular embodiment, the locking element is inserted into an opening in the safety helmet and is engaged by the locking arrangement once inside the opening. For example, the opening may be provided in an outer cover of the helmet body or an outer casing which encloses or overlies the locking arrangement. The opening may be formed in an outer shell of the helmet. According to this form of the disclosed safety helmet, the locking arrangement may be enclosed or obstructed by some form of casing to thereby prevent tampering but which includes an opening through which the locking element can be inserted in order to allow locking engagement between the locking element and the locking arrangement.

According to an embodiment contemplated herein, the tether is extendable from and retractable into the locking arrangement. This form of the disclosed safety helmet advantageously allows the tether to be retracted when the helmet is in use on a wearer's head and to be selectively extended when its locking functionality is required.

The locking arrangement may include a reel around which the tether is wound and unwound during retraction or extension of the tether. The reel may comprise a rotatably mounted reel or spool. The reel could be located within or recessed into a cavity of the helmet body. The reel may be of sufficient size to accommodate substantially all of the length of the tether when wound around the reel. In a particular embodiment, the reeled tether may be extendible to a length of approximately 70 cm. This length is therefore significantly longer than would be possible with a conduit or tracked-type tether provided in earlier systems such as Chinese patent application 212938193, Korean patent application 20120000327 and U.S. Pat. No. 4,766,616. In particular forms of the disclosed safety helmet, the tether may be extendible to lengths longer than 70 cm or shorter than 70 cm depending on the intended application. The reel may be securely connected to a proximal end of the tether so that an opposite distal end of the tether (i.e. the free end of the tether) can only be extended until the reel is completely unwound at which point the connection between the reel and the proximal end prevents further extension of the tether.

The reel may be configured as a self-winding reel to eliminate the need for a user to manually re-wind (i.e. retract the tether onto the reel after each use). The tether may therefore be a self-retractable tether. The reel may include a self-winding mechanism, configured to rotate the reel in a winding direction and induce retraction of the tether. The self-winding mechanism may include a button (or similar user interface) for operating the self-winding mechanism. For example, the locking arrangement may include a button which is pressed to trigger retraction of the tether onto the reel. The free end of the tether may then retract until a predetermined retraction point. For example, the reel may feed the tether through an opening in the safety helmet which has a diameter between that of the tether and that of the locking element. Pressing the retraction button may thereby retract the tether until the locking element reaches the opening whereupon it is too large to enter the opening and retraction is halted and the tether may thereby be in its retracted position. Alternatively, pushing the traction button may retract the tether until the locking element reaches an abutment which causes retraction to be halted. In a particular embodiment, an abutment comprising an internal stopping element is provided at the lock mechanism and which is contacted by (or acts upon) a portion of the locking element during retraction in order to stop retraction at a predetermined point.

In an alternative embodiment the self-winding mechanism may not necessarily include a retraction button but instead has a 'pull-to-retract' configuration. According to this configuration, extending the tether will initially result in the self-winding mechanism disengaging such that the tether will remain at the selected length. From this position, a further pulling of the tether will re-engage the self-winding mechanism and cause retraction of the tether onto the reel. It will be appreciated that various configurations and alternatives of the self-winding mechanism are envisaged and may be implemented within the scope of the present disclosure.

According to a particular embodiment, the self-winding mechanism may include a coil spring. The coil spring may be configured to bias the reel toward a fully-retracted mode. That is, in a fully retracted mode the coil-spring is at a lowest elastic potential energy state. Manual extension of the tether causes the reel to rotate so as to unwind the tether which simultaneously causes winding up of the coil spring and thereby moving the spring to a higher elastic potential energy state. Subsequent triggering of the self-winding mechanism (for example via a retraction button or via a push-to-retract configuration) releases the coil spring causing unwinding of the coil spring which corresponds to re-winding of the tether onto reel.

Selective locking of the locking member could be provided in a variety of ways. The locking arrangement may include a key lock which is lockable and unlockable using a key. According to an alternative embodiment, the locking arrangement includes a combination lock mechanism allowing selective locking and unlocking of the locking member. The combination lock may include two, three or more rotatable dials which are aligned to enter a predetermined combination of numbers in order to disengage the lock mechanism and unlock the free end of the tether from the locking arrangement. The combination lock may include a button which allows the combination to be reset according to a user's preferred combination.

The integration of the locking arrangement with the helmet body may be provided in a number of configurations. Used herein, the term 'integrated' will be understood to mean not releasably connected to and/or concealed within the helmet body to as to prevent tampering or removal of the locking arrangement. According to an embodiment of the disclosed safety helmet, the locking arrangement is internally integrated with the helmet body. This provides an anti-tampering configuration whereby the lock mechanism is concealed from easy access by a thief. Furthermore, the lock components are less prone to being dislodged or forcibly removed from the helmet body or snagging or entangling with external objects during use. This provides a further advantage over some earlier locking helmets in which the locking arrangement is exposed and may become tangled with the tether and/or the straps of a user's backpack or similar.

According to an embodiment of the disclosure, the locking arrangement is secured to the helmet body so as to prevent or resist the locking arrangement being separated from the helmet body. According to an embodiment of the disclosure, the locking arrangement is concealed behind a cover plate or is concealed behind a portion of the helmet body so as to prevent or obstruct access to the locking arrangement. According to an embodiment of the disclosure, the locking arrangement is located within a lock casing which is integrated with the helmet body. For example, the lock casing may be shaped for receipt within a correspondingly shaped cavity in the helmet body and may be secured in such a way so as to prevent, obstruct or deter a thief from attempting removal of the lock casing from the helmet body.

The locking arrangement may integrated with the helmet body so as to be inseverable with the helmet body. The locking arrangement may be integrated with the helmet body so as to be not non-destructively severable. According to this embodiment, the locking arrangement might be severed from the helmet with appropriate tools and time but to do so would effectively destroy or damage the helmet body. Thus, term 'integrated' can be understood as requiring the locking arrangement to be formed integrally with the helmet body, so that the locking arrangement is not separable from the helmet body in the ordinary use of the safety helmet.

The helmet body may include an outer shell overlying an impact-absorbing material and wherein the outer shell at least partially overlies the locking arrangement. The outer shell may comprise a rigid shell or a flexibly resilient shell. The outer shell may comprise, for example, Acrylonitrile butadiene styrene (ABS), polycarbonate (PC) or a blend of these materials or a polyethylene terephthalate (PET) or other polymer. The outer shell may be formed of polymer. The impact-absorbing material may comprise expanded polystyrene (EPS).

According to an embodiment of the disclosure, the helmet body includes a cavity containing the locking arrangement. The helmet body may include a housing or casing containing the locking arrangement. The housing or casing may be located within a cavity in the helmet body. Alternatively, the locking arrangement may not be provided within a casing or housing and, for example, the locking arrangement may be located within a cavity in the helmet body such that the helmet body itself acts as a lock casing or lock housing. The casing may therefore comprise a portion of the helmet body for example a portion of the outer shell and/or impact-absorbing material of the helmet. The locking arrangement may be concealed behind a portion of the outer shell so as to provide an anti-tampering configuration. The cavity of the helmet body may be formed within the impact-absorbing material. The cavity may comprise a cut-away or a recess in the impact-absorbing material. The cavity may comprise a pre-formed cavity or recess in the impact-absorbing material. For example, the impact-absorbing material may be shaped, formed or cut with a recess or cavity configured to house the locking arrangement. The locking arrangement may therefore be at least partially surrounded with impact-absorbing material.

The locking arrangement may be adjacent to impact absorbing material on multiple sides. For example, the locking arrangement may be positioned at a lower rear portion of the helmet body. In a particular embodiment, a combination lock mechanism is integrated into a lower rear portion of the helmet body. According to this configuration, an upper side and left and right lateral sides of the locking arrangement may be adjacent to and/or bounded by impact-absorbing material. The locking arrangement may be located in a cavity which is bounded on several sides by impact-absorbing material. For example, the cavity upper side, left and right sides and an inner side (i.e. in the direction of the wearer's head) may be bounded by impact-absorbing material.

A lower side (i.e. a downwardly-facing side) of the locking arrangement may be adjacent to a downwardly-facing side or end of the helmet body. The safety helmet may be configured such that the locking member is located at this downwardly-facing side. In embodiments of the disclosed safety helmet where the locking member is extendable, the locking member may be extendable from a downwardly-facing (i.e. a lower) side of the locking arrangement. According to an embodiment of the disclosed safety helmet, the locking member comprises an extendable tether which is drawn through a tether opening on the downwardly-facing side of the helmet body.

According to an embodiment of the disclosed safety helmet, the helmet body includes an inner surface configured to contact to contact the wearer's head and a portion of the impact-absorbing material may be positioned between the locking arrangement and the inner surface. A portion of impact-absorbing material is therefore located between the locking arrangement and the wearer's head to protect the head in the event of an impact at the region of the locking arrangement. The inner surface of the helmet body may comprise a padding or cushioning arrangement which overlies an inner surface of the impact-absorbing material and is configured to contact the wearer's head.

According to an embodiment of the disclosed safety helmet, the locking arrangement is at least partially hidden or concealed within the helmet body. As noted above, the locking arrangement may be at least partially covered by the outer shell of the helmet body. In some forms of the disclosed safety helmet the locking arrangement may be located behind a cover or within a lock casing.

The lock casing may be configured for receipt in a cavity or recess of the helmet body. For example, the lock casing may be shaped to conform with a shape of a cavity in the helmet. The lock casing may be contoured to conform with and to be receive within a cavity in the helmet. The lock casing may be contoured so as to conform with a curve in a lower rear region of the helmet. The lock casing may be contoured so as to conform with surfaces of the lower rear region of the helmet. The lock casing may be configured to fit flush with the outer shell or provide a contoured protrusion with respect to the outer shell so as to form a generally continuous surface with the outer shell. For example, a rear side of the lock casing may form a generally continuous surface with a rear side of the outer shell. An external surface of the helmet body may have a contoured configuration which overlies the locking arrangement. For example, the helmet body may have a contoured protrusion under which there is a cavity for receiving the locking arrangement or for receiving a lock housing or casing which contains the locking arrangement.

BRIEF DESCRIPTION OF DRAWINGS

The present disclosure describes examples with reference to the figures of the accompanying drawings, which illustrate particular preferred embodiments of the disclosed safety helmet, wherein:

FIG. 3 is a rear view of the helmet of FIGS. 1 and 2 with the locking cable retracted;

FIG. 4 is a review view of the helmet of the preceding figures with the locking cable extended and locked by the locking arrangement;

DETAILED DESCRIPTION

Figure 1:
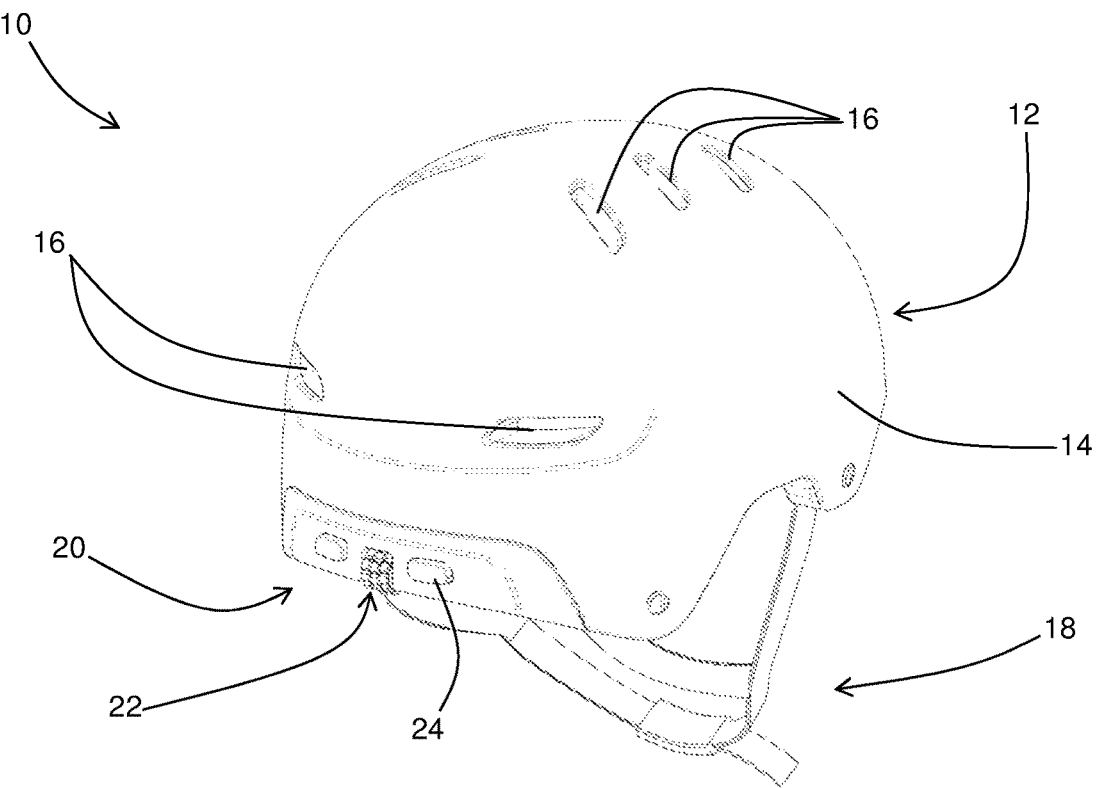
FIG. 1 is a rear perspective view of a safety helmet according to the present invention.

FIG. 1 illustrated a safety helmet comprising a safety helmet 10 which, in the illustrated embodiment, is a bicycle helmet 10 but is to be appreciated may be provided as other types of safety helmets. The helmet 10 includes a wearable helmet body 12 which includes an outer shell 14 comprising a rigid polymer material such as polycarbonate or acrylonitrile butadiene styrene. The helmet body 12 includes a number of ventilation openings 16. The helmet 10 further includes an adjustable strap 18 for securing the helmet body 12 to a wearers head.

A locking arrangement 20 is integrated with the helmet 10 at a lower rear portion of the helmet body 12. The locking arrangement 20 includes a three-dial combination lock 22 which facilitates selective locking of the helmet 10 to an external fixture. The combination lock 22 includes three rotatable dials 23. The combination lock 22 is pre-set with a numeral combination which, when entered via the three dials 23, results in disengagement (i.e. unlocking) of the combination lock 22. The locking arrangement 20 includes a combination reset button 24 allowing a user to reset the numerical combination of the combination lock 22. In some embodiments, the combination reset button 24 may also act as a lock release button which disengages a locking pin (not shown) of the combination lock 22 when the correct combination is entered. The button 24 may therefore comprise an unlock/reset button 24.

Figure 2:
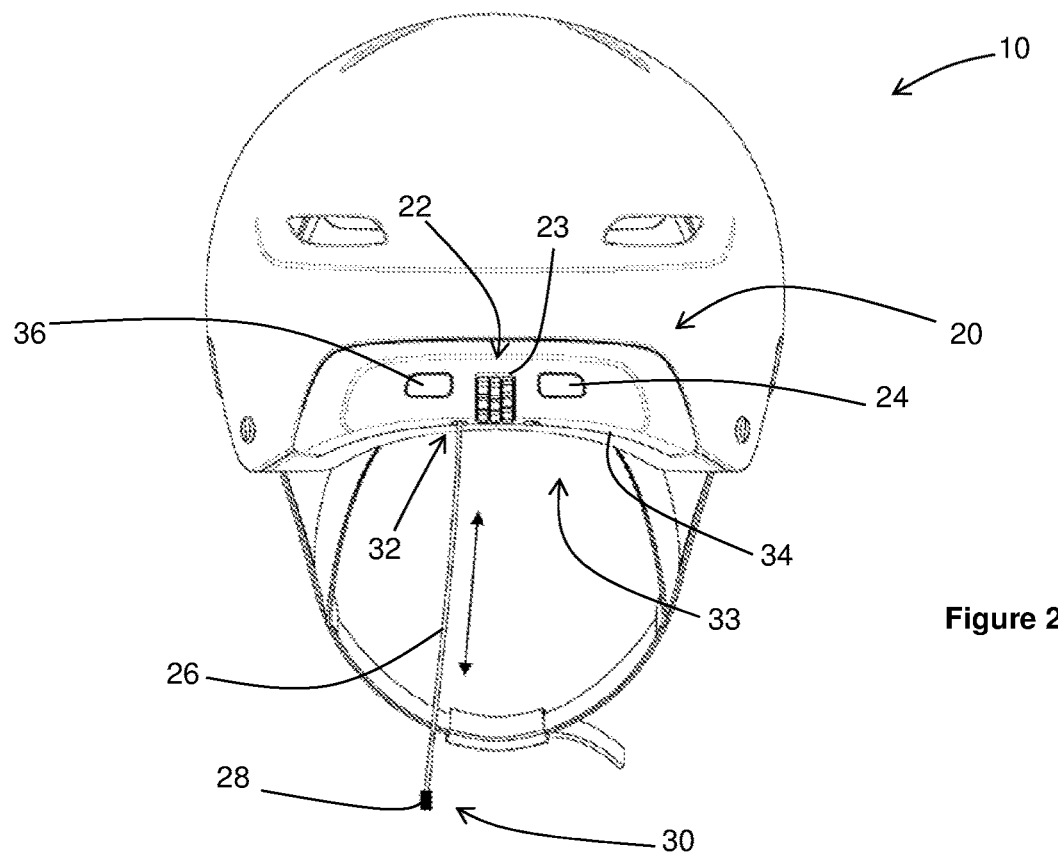
FIG. 2 is a rear view of the helmet of FIG. 1 with locking cable partially extended.

With reference to FIG. 2, the locking arrangement 20 further includes a locking member comprising a flexible tether 26 which is extendable from and retractable into the locking arrangement 20. The flexible tether 26 comprises a steel cable and includes a locking element 28 at a distal end 30 of the flexible tether 26 and which is also a free end 30 of the tether 26, as shown in FIG. 2. The locking element 28 comprises a steel pin of slightly larger diameter than the tether 26.

As shown in FIG. 2, the tether 26 extends from a lower side 33 of the locking arrangement 20. The tether 26 extends through a tether opening 32 located on a downwardly-facing surface 34 at the lower side 33. The locking arrangement further includes a tether retraction button 36 which triggers retraction of the tether 26 via a self-winding mechanism which will be discussed in further detail below. The tether retraction button 36 and the unlock/reset button 24 are positioned on opposite sides of the rotatable combination lock dials 23.

FIG. 2 illustrates the tether 26 in a partially extended position for illustrative purposes. FIG. 2 illustrates the tether 26 in an unlocked configuration whereby the user is free to draw (i.e. extend) the tether 26 from the locking arrangement 20 or, alternatively, to press the tether retraction button 36 in order to retract the tether 26.

Turning to FIGS. 3 and 4, the tether is shown in fully retracted and fully extended positions respectively. FIG. 3 illustrates the tether 26 having been fully retracted such that only the locking element 28 is visible and is positioned outside of the tether opening 32.

FIG. 4 illustrates the tether 26 in a fully extended position and also in locked configuration whereby the locking element (not visible in FIG. 4) has been inserted into a lock opening 38 in the downwardly-facing surface 34. Inside the lock opening 38, the locking element is engaged by an internal locking mechanism when the user rotates the dials of the combination lock 22 away from the correct combination. When the combination lock 22 is set to an incorrect combination, the locking element 28 is locked by the internal locking mechanism, thereby preventing withdrawal of the locking element 28. As shown in FIG. 4, the tether 26 is thereby locked in a closed loop configuration 40 which allows the helmet 10 to be securely tethered to an external fixture such as a bike rack.

Figure 5:
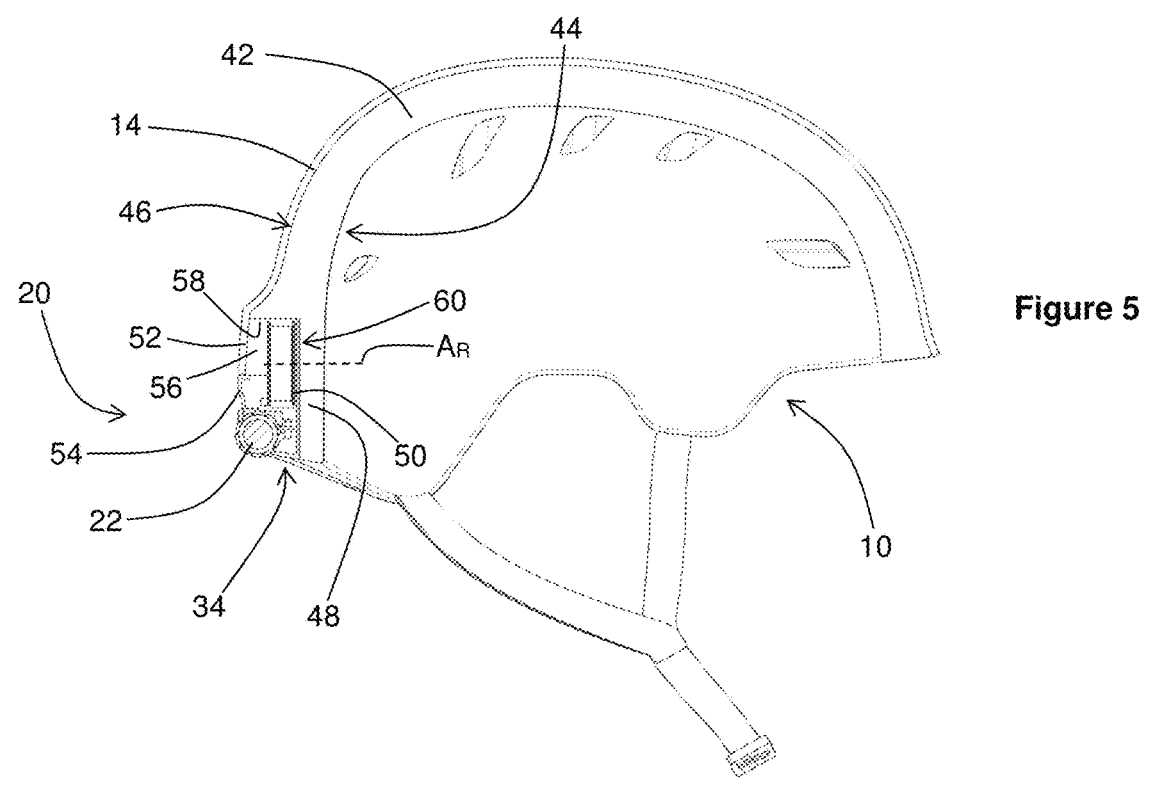
FIG. 5 is a side view of the helmet of the preceding Figures with a cross-sectional view of the locking arrangement.
Figure 6:
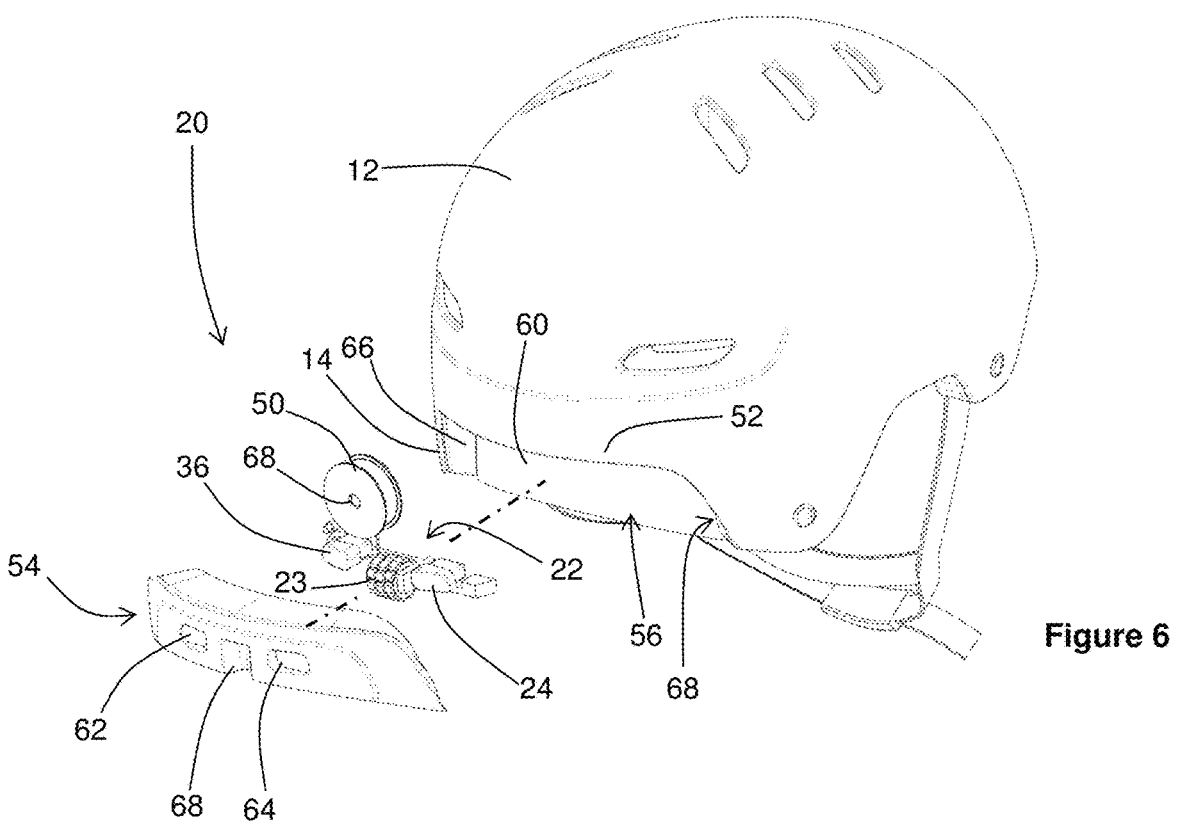
FIG. 6 is a perspective of the helmet of the preceding figures with a partially exploded view of the locking arrangement.

With reference to FIGS. 5 and 6, parts of the locking arrangement 20 will now be described in further detail.

FIG. 5 provides a side sectional view in which internal components of the helmet 10 are shown. The helmet body 12 includes a layer of impact absorbing material comprising a helmet liner 42 which is configured to surround an upper portion of a wearer's head. The helmet liner 42 could be formed of, made of or otherwise comprise one or a combination of impact-absorbing materials such as expanded polystyrene (EPS) and/or expanded polypropylene (EPP). Other types of impact-absorbing material may be suitable. The helmet liner 42 includes an inner surface 44 and an outer surface 46. The outer shell 14 overlies the outer surface 46 of the helmet liner 42.

In some embodiments of the disclosed helmet, the inner surface 44 of the helmet liner 42 may contact the wearer's head directly. In other embodiments, the inner surface 44 of the helmet liner 42 may be fitted with cushioning or padding which, in use, contacts the wearer's head. In either case, the helmet body 12 includes an inner surface configured to contact the wearer's head and, depending on which of alternatives above is used, this inner surface will either be the inner surface 44 of the helmet liner 42 or will be a surface on cushioning or padding arrangement fitted to the inner surface 44 of the helmet liner 42.

Still referring to FIG. 5, a portion 48 of the helmet liner 42 is located between the locking arrangement 20 and the inner surface of the helmet which is configured to contact the wearer's head. The portion 48 is therefore positioned to protect the rear of the wearer's head in the event of an impact applied to the region of the locking arrangement 20. This portion 48 is preferably suitably thick to provide similar or greater shock-absorption qualities as compared to a standard helmet that does not feature an integrated locking device.

The locking arrangement 20 includes a tether reel 50 onto which the tether 26 is wound and unwound during retraction or extension of the tether 26. As shown in FIG. 5, the tether reel 50 is partially covered by an overhanging portion 52 of the outer shell 14 which overhangs a cavity 56 that will be discussed in further detail below. The tether reel 50 is also partially covered by the lock casing 54.

The locking arrangement 20 is located with a lock casing 54 so as to conceal the locking arrangement 20 and reduce the risk of lock tampering. The casing 54 may be formed of a similar or equivalent polymer material to that of the outer shell 14.

The locking arrangement 20 is located within a cavity 56 located at the lower rear portion of the helmet body 12. The cavity 56 is pre-formed in the helmet liner 42 and includes an upper wall 58 and a front wall 60 which are each part of the helmet liner 42. The cavity 56 is therefore bounded on its front and upper sides by the helmet liner 42. The cavity 56 is bound on its rear side by the outer shell 14 (in particular the overhanging shell portion 52) and also by the lock casing 54. The locking arrangement 20 is thereby integrated with the helmet body 12 and, in particular, is internally integrated with the helmet body 12. It will be appreciated that the integration of the locking arrangement 20 with the helmet body 12 provides a significant advantage over existing (non-integrated) locking devices such as bike locks which are separate and severable to a safety helmet and to a bicycle.

The lock casing 54 is configured for receipt in the cavity 56. In particular, the lock casing 54 corresponds in shape to the cavity 56 so as to permit receipt of the lock casing 54 in the cavity 56. The lock casing 54 may also advantageously structurally support integrity of the helmet body 12 in the area of the cavity 56. The lock casing 54 (with the locking arrangement 20 contained therein) may be secured within the cavity 56 in a variety of ways such as screws, rivets, adhesives, circlips or other fasteners. The lock casing 54 may be secured within the cavity 56 via tamper-resistant fasteners. For example, via screws which require special tools to remove. The fasteners may be deliberately located in an awkward position so as to make removal difficult, inconvenient or impractical for an opportunistic thief. The locking arrangement 20, via its lock casing 54, may therefore be integrated with the helmet body 12 in such a way so as to deter a thief from attempting removal of the locking arrangement 20 from the helmet and thereby deter a thief from attempting to steal the helmet and/or the equipment or device being locked by the helmet locking arrangement 20.

As shown in FIG. 6, the cavity 56 and the lock casing 54 are contoured so as to partially wrap around the lower rear region of the helmet body 12. The lock casing 54 may comprise a moulded casing. The casing 54 may comprise a two-part moulded casing wherein first and second parts are secured together to collectively define the casing or housing and to enclose the locking arrangement 20. The casing 54 may be suitably sized to provide additional strength to the helmet and protection for the lock arrangement in transport, during assembly and in use.

Still referring to FIG. 5, the combination lock 22 is positioned lower than the tether reel 60 and is adjacent to the downwardly-facing surface 34. The tether reel 60 is rotatable mounted with an axis of rotation $A_R$. The tether reel axis of rotation $A_R$ is approximately parallel with a front-rear axis of the helmet body 12. FIG. 5 also illustrates that an exterior surface of the lock casing 54 is approximately aligned (i.e. is flush with) with the overhanging portion 52 such that the lock casing 54 provides a continuous surface with the outer shell 14 on the rear side of the helmet body 12.

Turning to FIG. 6, a partially exploded view of the locking arrangement 20 is provided. The lock casing 54 is shown exploded to reveal internal components of the locking arrangement 20. The lock casing 54 includes a pair of openings comprising a first opening 62 configured to receive the tether retraction button 36 and a second opening 64 configured to receive the unlock/reset button 24. The lock casing 54 further includes a dial opening 68 located between the pair of openings 62, 64 for receiving the dials 23 of the combination lock 22.

The tether reel 50 includes a central opening 68 permitting rotatable mounting of the reel 50. The cavity 56 formed in the helmet body 12 is best shown in FIG. 6 and, in particular, the left side wall 66, right side wall 68 and front wall 50 are visible. Each of these walls are formed from the helmet liner 42. The overhanging portion 52 of the outer shell 14 conceals a part of the cavity 56 (which includes the upper wall 58) that is not visible in FIG. 6 but is shown in FIG. 5.

In alternative configurations (not shown) to that of FIGS. 5 and 6, the helmet body may be provided without the overhanging portion 52 and, for example, the locking arrangement 20 could be covered by a casing only. In another alternative embodiment, a larger overhanging portion could be provided which covered the whole lock arrangement 20. In some embodiments, the locking arrangement 20 could be provided without the casing 54 and the lock casing could instead comprise part of the helmet body. For example, a recess or cavity or slot or opening formed in the helmet body behind the shell 14 into which the locking arrangement 20 is located. The locking arrangement (including the movable components such as the reel 50, buttons 36, 24 and combination lock 22) may therefore be integrated within the helmet body 12. The buttons 36, 24 could protrude through openings in the helmet shell 14 which may extend continuously to a lower rear edge of the helmet.

Various lock mechanisms may be suitable for use with the present invention. A particular mechanism suitable for use with the invention may be a lock mechanism such as a 3-digit retractable cable lock (e.g., a SINOX® TL956 lock) wherein the internal lock mechanism is located within the casing, housing or cavity of the helmet body 12 in order to integrate the lock mechanism with the helmet body 12.

Depending on the cavity configuration, the internal lock mechanism of the TL956 (or another 'off the shelf' lock mechanism) could be adapted or reconfigured to correspond with the particular dimensions or configuration of the cavity 56 in the helmet body 12. An off the shelf lock mechanism may also be adapted to locate the buttons for improved functionality when using the safety helmet disclosed herein.

Figure 7:
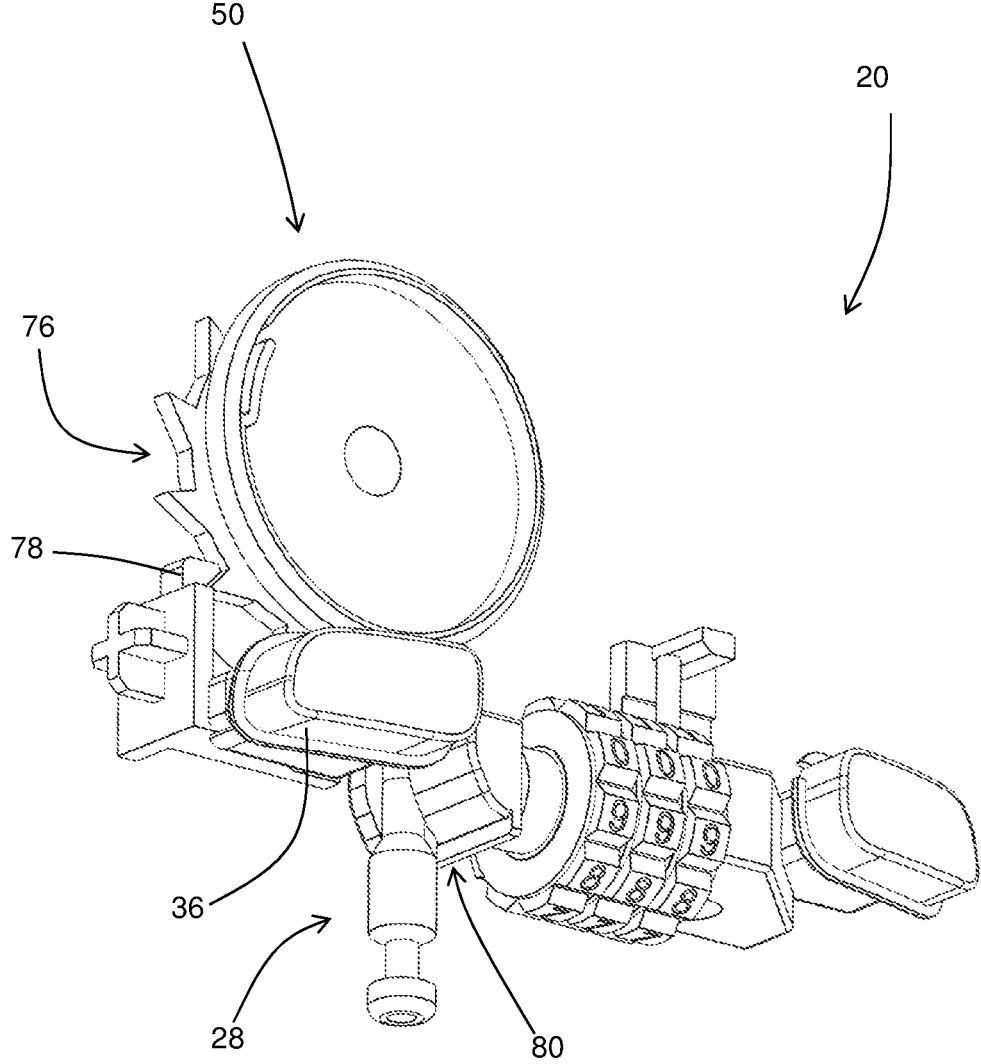
FIG. 7 is an alternative and closer view of the locking arrangement shown in FIG. 6.

For example, the buttons and dial may be positioned at the rear helmet surface (as shown in the FIGS. 1-6) to provide improved visibility of controls and allowing the user to grip the helmet and press the buttons with more direct and natural finger action. The tether reel 50 may be offset from centre (as illustrated in FIGS. 6 and 7) so the thickness of the locking arrangement 20 is more suited to the curved rear surface of the helmet body 12. The configuration of an off the shelf lock such as the TL956 may also be reconfigured so as to better distribute weight of the components as low as possible and in order to provide minimal rearward protrusion so as to reduce the possibility of snagging external objects as well as less weight imbalance for the wearer.

Turning to FIG. 7, an alternative view of the locking arrangement 20 is provided and with some additional features illustrated. The tether reel 50 includes a ratchet wheel 76 engaged with a pawl 78 which prevents retraction of the spring-loaded tether reel 50 until the retraction button 36 is pressed and which disengages the pawl 78 from the ratchet wheel 76.

The locking element 28 is shown in the retracted position and in contact with an abutment 80. The abutment 80 acts the locking element 80 once the locking element 28 is retracted to the fully-retracted position shown in FIG. 7. At this position, the locking element 28 abuts the abutment 80 preventing further retraction of the locking element 28 toward the tether reel 50.

Figures 8, 8A:
FIG. 8 is a view of the helmet of the preceding figures being used to lock a bicycle to a bicycle rack.
FIG. 8A is a closer perspective of detail K in FIG. 8.

Turning to FIGS. 8 and 8A, an example application of the helmet 10 is illustrated. FIG. 8 illustrates a bicycle 70 being locked via the safety helmet 10 to an external fixture comprising a bicycle rack 72. A closer perspective of detail K in FIG. 8 is provided in FIG. 8A.

With reference to FIG. 8A, the free end of the tether 26 has been fed around the bicycle seat stays 74 and the rack 72 and locked to the locking arrangement 20. The bicycle seat stays 74 and the bicycle rack 72 are enclosed within the closed loop 40 such that the helmet 10 and the bicycle 70 are simultaneously locked to the bicycle rack 72. The tether 26 thereby secures both the helmet 10 and the bicycle 60 to the rack 72. It will be appreciated that the helmet 10 may in some instances obviate the need to carry a separate bicycle lock in order to secure a bicycle to a bicycle rack.

Figure 9:
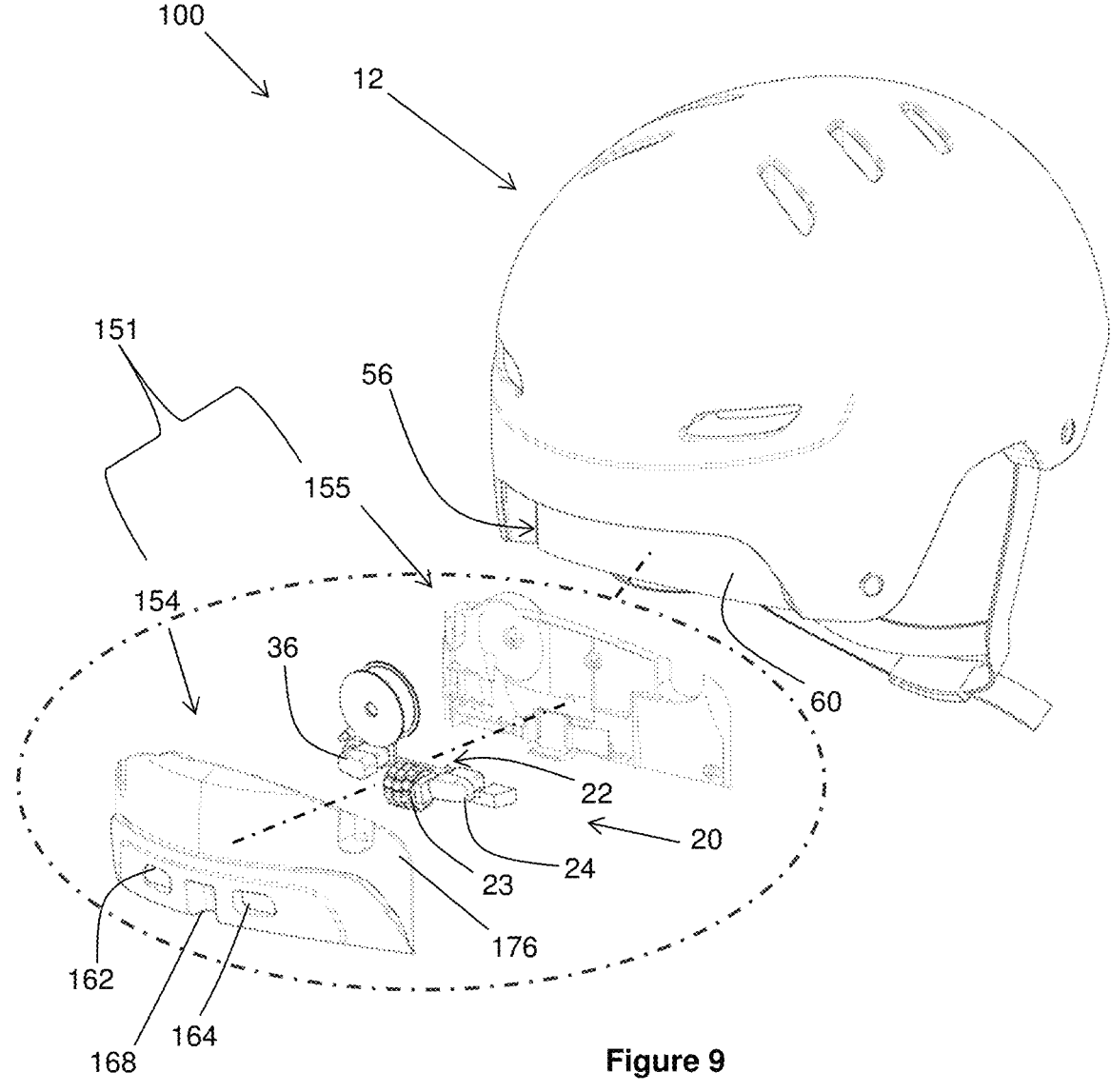
FIG. 9 is a rear perspective and partially exploded view of an alternative embodiment of the helmet.

FIG. 9 illustrates a safety helmet 100 according to an alternative embodiment of the disclosed safety helmet. Safety helmet 100 includes a helmet body 12 and locking arrangement 20 which are equivalent to that of the safety helmet 10 according to the preceding embodiment illustrated in FIGS. 1-6.

Safety helmet 100 but differs from helmet 10 in that the helmet 100 includes a two-piece lock casing 151 for the locking arrangement 20. The lock casing 151 includes an outer casing portion 154 and an inner casing portion 155. The casing 151 is located at the lower rear edge of the helmet body 10. The outer casing portion 154 is configured as an external component. The inner casing portion 155 is positioned at the front wall 60 the cavity 56 and therefore concealed behind the locking arrangement 20 and the outer casing portion 154.

The outer casing portion 154 includes a first opening 162 configured to receive the tether retraction button 36 and a second opening 164 configured to receive the unlock/reset button 24. The outer casing portion 154 further includes a dial opening 168 located between the first and second openings 162, 164 for receiving the dials 23 of the combination lock 22.

Figure 10:
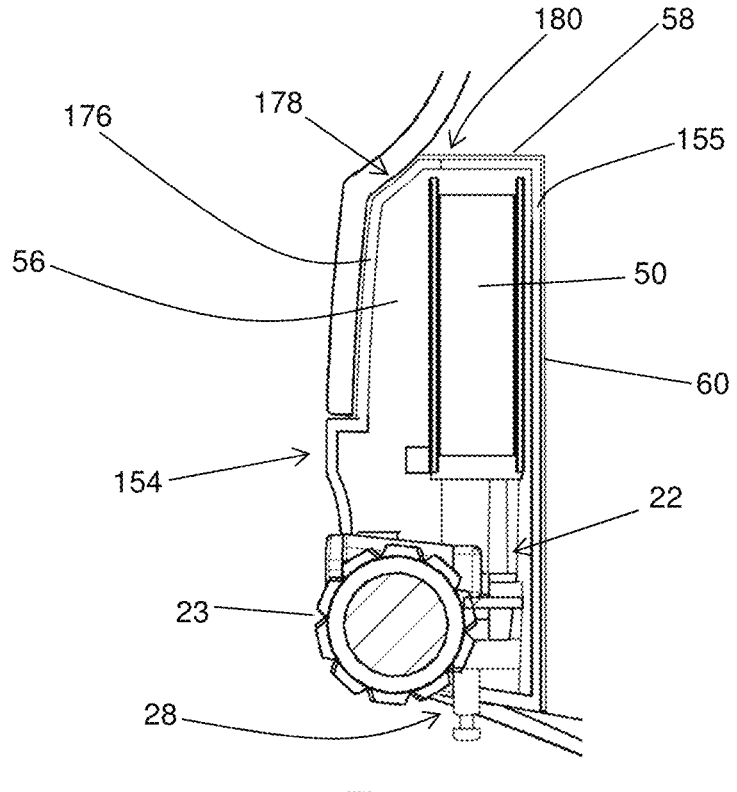
FIG. 10 is a cutaway side view of the embodiment of FIG. 9.

The outer casing portion 154 includes an upwardly extending flange 176 which is received within cavity 56 in the helmet body 12, as shown in FIG. 10. The flange 176 is shaped to correspond with a portion of the cavity 56 and, in particular, is shaped to correspond with a bevelled corner 178 of the cavity 56. As shown in FIG. 10, the flange 176 abuts the inner casing portion 155 at an interface 180 located at the upper wall 58 of the of the cavity 56. The inner casing portion extends 155 along the cavity upper wall 58 and along the cavity front wall 60.

The locking arrangement 20 may therefore be secured between the inner and outer casing portions 154, 155 to secure the locking arrangement 20 in position and to resist tampering. In a particular form of the disclosed safety helmet, the inner and outer casing portions 154, 155 are secured together via fasteners or another suitable connection configuration. One or both of the inner and outer casing portions 154, 155 may be secured to the helmet body 12 via fasteners or via any other suitable connection configuration.

As shown in FIG. 10, the locking arrangement 20 including the tether reel 50 is secured within the casing 151 with the rotatable dials 23 exposed through dial opening 168 at a base of the casing 151 to allow manual operation of the combination lock 22. The locking element 28 on the distal end of the tether protrudes from a base of the cavity 56 and is configured for extension in a downward direction relative to the perspective in FIG. 10.

The locking element 28 is thereby located in an area of minimal probability of impact and away, for example, from the rear of the helmet which is of higher impact likelihood in the event that the wearer fall backwards and contacted their head, for example, onto a footpath during a scooter, skateboard or bicycle crash. Furthermore, the minimal protrusion and positioning of the locking element 28 minimises probability of accidental contact or snagging on objects worn by the user e.g. a backpack or external objects such as tree branches.

As will be appreciated from the foregoing discussion and drawings, particular FIGS. 5 and 10, the locking arrangement 20 is advantageously concealed within the cavity 56 of the helmet body 12. As well as allowing for convenient operation of the retractable tether and combination lock, the present disclosure thereby provides an aesthetically pleasing and streamlined integration of the locking arrangement. The design of the front, sides and top of the helmet body 12 are unaffected by the presence of the integrated locking arrangement 20. In contrast to some existing helmet lock systems, the present disclosure allows for helmet design and aesthetics to be generally uncompromised by the presence of the locking arrangement 20 which has a desirably minimal impact in overall helmet aesthetics. Furthermore, helmet aerodynamics are minimally impacted insofar as the locking arrangement is positioned at the lower rear side of the helmet body 12 and therefore out of the oncoming wind flow and which may be of particular benefit in certain high-speed sports such as skiing and cycling.

It will be appreciated from the above description that the present disclosure therefore provides a significant improvement in convenience as well as a significant improvement in security against helmet theft. Furthermore, the present invention addressed the additional problem of users either forgetting or losing their bicycle lock and realising they are unable to leave their helmet and/or bike unattended upon arrival at their destination.

Those skilled in the art will appreciate that the safety helmet as described herein is susceptible to variations and modifications other than those specifically described. It is understood that the safety helmet contemplated herein includes all such variations and modifications which fall within the spirit and scope of the present disclosure.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The claims defining the invention are as follows:

1. A safety helmet comprising:
   a helmet body configured for protecting a wearer's head, the helmet body comprising an outer shell overlying an impact-absorbing material;
   an adjustable strap for securing the helmet body to the wearer's head;
   a locking arrangement integrated with the helmet body and a locking member, the locking member comprising a tether which is extendible and retractable with respect to the locking arrangement, the locking arrangement configured to selectively lock the tether in a closed configuration allowing secure tethering of the safety helmet to an external fixture, and the locking arrangement further including a reel around which the tether is configured to be wound and unwound during retraction or extension of the tether; and
   a self-winding mechanism configured to rotate the reel in a winding direction to induce retraction of the tether; and
   a lock casing containing the locking arrangement within a cavity of the helmet body, the lock casing having an exterior surface that is flush with the outer shell and forms a portion of a rearwardly-facing exterior surface of the safety helmet.

2. The safety helmet according to claim 1, wherein the closed configuration of the tether comprises a closed loop configuration.

3. The safety helmet according to claim 1, wherein the locking arrangement is configured to lock a free end of the tether to the locking arrangement.

4. The safety helmet according to claim 3, wherein the free end of the tether includes a locking element and the locking arrangement is configured to engage with the locking element in order to lock the free end of the tether to the locking arrangement.

5. The safety helmet according to claim 1, wherein the outer shell at least partially overlies the locking arrangement.

6. The safety helmet according to claim 1, wherein the helmet body includes an inner surface configured to contact the wearer's head and wherein a portion of the impact-absorbing material is located between the locking arrangement and the inner surface.

7. The safety helmet according to claim 1, wherein the cavity is formed in the impact-absorbing material.

8. The safety helmet according to claim 1, wherein the cavity is formed between the outer shell and the impact-absorbing material.

9. The safety helmet according to claim 1, wherein the lock casing includes a portion of the outer shell and/or the impact-absorbing material.

10. The safety helmet according to claim 1, wherein the lock casing is shaped for receipt in a corresponding shape of the cavity in the helmet body.

11. The safety helmet according to claim 1, wherein the lock casing is configured to provide a continuous surface with the outer shell.

12. The safety helmet according to claim 1, wherein an external surface of the helmet body has a contoured configuration which overlies the locking arrangement.

13. The safety helmet according to claim 1, wherein the locking arrangement has an anti-tampering configuration whereby the locking arrangement is concealed behind a portion of the outer shell.

14. The safety helmet according to claim 1, wherein the locking arrangement is located at a lower rear portion of the helmet body.

15. The safety helmet according to claim 1, wherein the tether is configured to allow simultaneous locking of the safety helmet and a bicycle to an external fixture.

16. The safety helmet according to claim 1, wherein the exterior surface of the lock casing comprises a rearwardly-facing exterior surface portion configured to facilitate user operation of the locking arrangement through the rearwardly-facing exterior surface portion.

17. The safety helmet according to claim 1, wherein the exterior surface of the lock casing is curved to conform with a curve in a lower rear region of the helmet body.

18. The safety helmet according to claim 17, wherein the exterior surface of the lock casing is curved to correspond with a curvature of the cavity.

19. The safety helmet according to claim 1, wherein the exterior surface of the lock casing comprises a rearwardly-facing exterior surface portion and a downwardly-facing exterior surface portion.

20. The safety helmet according to claim 1, wherein the tether is extendible to a length of at least 70 cm.

* * * * *